H. TAYLOR.
AUTOMOBILE BUMPER.
APPLICATION FILED NOV. 17, 1917.

1,338,597.

Patented Apr. 27, 1920.

Inventor
Howard Taylor

Attorneys

UNITED STATES PATENT OFFICE.

HOWARD TAYLOR, OF PHILADELPHIA, PENNSYLVANIA.

AUTOMOBILE-BUMPER.

1,338,597.   Specification of Letters Patent.   Patented Apr. 27, 1920.

Application filed November 17, 1917. Serial No. 202,519.

*To all whom it may concern:*

Be it known that I, HOWARD TAYLOR, a citizen of the United States, residing at Philadelphia, in the county of Philadelphia and State of Pennsylvania, have invented certain new and useful Improvements in Automobile-Bumpers; and I do hereby declare the following to be a full, clear, and exact description of the invention, such as will enable others skilled in the art to which it appertains to make and use the same.

This invention relates to bumpers and more particularly to a type of bumper adapted for connection to automobiles.

It is one of the objects of the present invention to provide an improved bumper construction which may be readily connected to a vehicle without requiring any alteration of the same or without necessitating drilling or machining the parts of the vehicle.

It is a further object of the present invention to provide a spring bumper for vehicles which may be connected in a most substantial and rigid manner to the vehicle construction, so as to be able to withstand heavy shocks which may be occasioned by the impact of the bumper against any object in its path.

It is another object of the invention to provide an improved bumper in which the parts are simple, easily and inexpensively manufactured, and which may be readily renewed or interchanged when necessary.

It is another object of the invention to provide for the substantial equal distribution of the strains generated by the compression of the bumper fore-piece to the associated carrying elements comprising the bumper.

It is one of the more important objects of the present invention to provide a bumper having a main spring member connected to yielding bracket and hanger or carrying members and to provide in association therewith an auxiliary or intermediate bumper spring to aid the principal bumper spring when the latter is subjected to shock strains.

Figure 1:
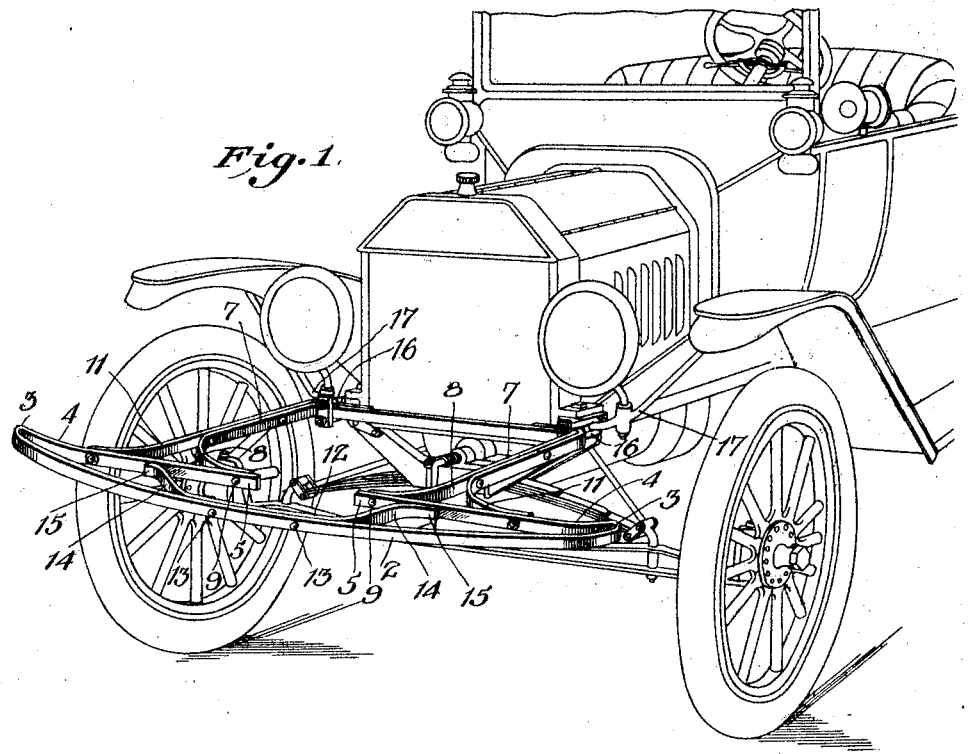
Figure 2:
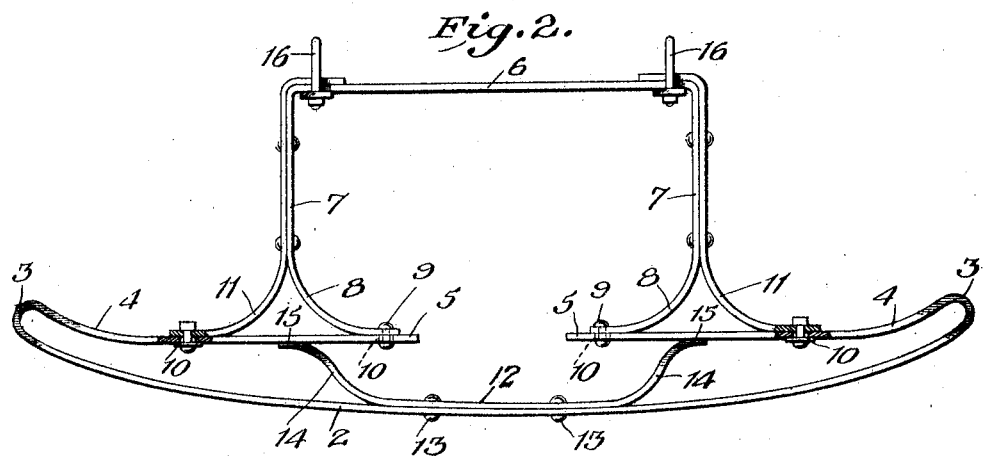

With these and other objects in view as will be rendered manifest in the following specification and which will become clear to those skilled in the art, the invention consists in the whole, the construction, the combination of the parts, and in details as more fully hereinafter described and set forth in the appended claims, one embodiment of the invention being illustrated in the accompanying drawing in which, Figure 1 is a perspective view of the improved bumper shown as mounted upon a vehicle, and Fig. 2 is a plan view of the bumper detached from the vehicle and partly broken away to show details of construction.

While it is understood that the present invention contemplates a shock absorber which is connected in the manner here illustrated, to one type of vehicle, it is apparent that it may be readily adapted to various types of vehicles, the bumper in the present instance, comprising a main, front bumper member 2 in the form of a resilient bar shown as in the nature of a flat spring of suitable length, which is bent at its ends 3—3 and returned as at 4—4 so as to form end sections 5—5 which are adapted to be connected to a suitable supporting construction here indicated as comprising a U-shaped bracket member 6 having front or forwardly extending arms 7—7, these being curved as at 8—8 behind the end portions 5—5. The end portions 5—5 are connected to the ends 8 of the bracket member 6 preferably through means of bolts 9—9 mounted in one of these parts. It is desirable that the ends 5—5 rest against the ends 8—8 of the bracket for play relative thereto and to secure this, the overlapping ends 8—8 or the end portions 5—5 may be provided with elongated apertures as indicated at 10—10, in the members 5 to freely receive the fastening bolts 9 and thus permit this play which will occur under certain conditions of operation.

As a further support for the transversely projecting end portions 5—5 of the main spring or bumper member 2, there is provided, preferably attached to each of the front arms 7, an outwardly curved resilient bracket member 11 which also is connected to the respective end portion 5 to permit relative movement of these parts as described in relation to the connections between the spring brackets 8 and the ends of the members 5.

One of the important features of the present invention is to provide an additional yielding member for the main or bumper member 2 to carry part of the strains to which this member is subjected and as here shown, an auxiliary spring member 12 is introduced between the central body portion of the member 2 and the parallel end portions 5—5 thereof, this spring member 12 being fastened by bolts or other suitable means 13 to the central portion of the member 2 and having its ends bent rearwardly and laterally as at 14, the extremities of the bent portions 14 bearing as at 15, freely on the end portions 5—5 where they are firmly supported by the diverged bracket members 8 and 11, respectively, of the hanger.

In the operation of this device, when the main bumper or fore member 2 is subjected to compression strains, by abutment with an obstacle, a portion of the strains is taken up by the auxiliary or take-up spring member 12, the ends 14 of which re-act upon the supported portions 5 and these portions in turn are yieldingly supported by the curved bracket members 8 and 11 of the hanger or carrying portion 6.

While the bumper thus described may be connected to the vehicle in any appropriate and expedient manner, a simple manner of attaching the bumper to a vehicle consists in the utilization of a set of U-clips 16 which may be passed about brackets 17, for instance, at the fore end of the vehicle chassis, such brackets being used in the type of car illustrated to carry the fenders. From this it will be seen that the bumper can be readily attached to a car without necessitating any alteration or machine work on the vehicle or the elements connected thereto.

It will be seen that when the cross-piece of the bracket hanger member 6 is drawn up against the front of the vehicle structure, in this instance, against the front of the radiator and secured there by the U-clips 16, that a very substantial load may be applied vertically to the bumper without involving the destruction or material distortion of the bumper member since the bracket is supported firmly by the cross-piece, bearing flat upon the front of the radiator frame.

What is claimed is:

1. A vehicle bumper comprising a front spring member having its ends each returned by a single bend and spaced from the rear thereof, a bracket adapted to be clamped to the front of the vehicle and having ends attached to returned ends of the front member, and an intermediate spring member secured to the front member and having rearwardly bent ends movably bearing upon the supported rear ends of the main member.

2. A vehicle bumper comprising a front spring member, having its ends returned toward each other and spaced from the rear thereof, a bracket adapted to be clamped to the front of the vehicle and having Y ends attached to the inturned ends of the front member, and an intermediate spring member secured to the front member and having rearwardly bent ends movably bearing upon the supported rear ends of the main member.

3. A vehicle bumper comprising a U-shaped bracket member adapted to be connected to the vehicle organization and having forwardly extending arms curved toward each other at their ends with oppositely branching sides to form seats, and a bumper element, the ends of which are returned to form spring bows which are connected respectively to each of the bracket branches.

4. A vehicle bumper comprising a U-shaped bracket member adapted to be connected to the vehicle organization and having forwardly extending arms curved toward each other with outwardly extending side pieces attached to the arms, branching ends, all the ends in a common plane to form seats, and a bumper element having a transverse front bar, connected to each of the seats of the bracket branches.

5. A vehicle bumper comprising a bracket structure adapted to be connected to the vehicle organization and having forwardly extending arms each with oppositely branching yieldable ends to form seats, a bumper element having a transverse front, the ends of which are returned to form spring bows and are movably connected to each of the bracket branches, and an auxiliary bow-shaped spring attached to the front member and bearing against the returned ends, respectively.

6. A vehicle bumper comprising a bracket structure adapted to be connected to the vehicle organization and having forwardly extending arms each with oppositely branching yieldable ends to form seats, the seats arranged in a line transverse to the vehicle body, and a bumper element having a transverse front, the ends of which are returned to form spring bows which are connected to each of the seats respectively.

In testimony whereof I affix my signature.

HOWARD TAYLOR.